US012595786B2

(12) United States Patent
Chou et al.

(10) Patent No.: US 12,595,786 B2
(45) Date of Patent: Apr. 7, 2026

(54) AIR COMPRESSOR STRUCTURE

(71) Applicant: UNIK WORLD INDUSTRIAL CO., LTD., Tainan City (TW)

(72) Inventors: Wen San Chou, Tainan City (TW); Cheng Hsien Chou, Tainan City (TW)

(73) Assignee: UNIK WORLD INDUSTRIAL CO., LTD., Tainan City (TW)

( * ) Notice: Subject to any disclaimer, the term of this patent is extended or adjusted under 35 U.S.C. 154(b) by 92 days.

(21) Appl. No.: 18/731,362

(22) Filed: Jun. 3, 2024

(65) Prior Publication Data

US 2025/0237206 A1      Jul. 24, 2025

Related U.S. Application Data

(60) Provisional application No. 63/624,772, filed on Jan. 24, 2024.

(30) Foreign Application Priority Data

May 9, 2024    (TW) ................................. 113117158

(51) Int. Cl.
F04B 37/12 (2006.01)
F04B 39/12 (2006.01)
(Continued)

(52) U.S. Cl.
CPC ............ F04B 37/12 (2013.01); F04B 39/123 (2013.01); F04B 51/00 (2013.01); G01L 7/166 (2013.01); G01L 19/16 (2013.01); F04B 2205/04 (2013.01)

(58) Field of Classification Search
CPC ........ F04B 37/12; F04B 39/12; F04B 39/123; F04B 51/00; F04B 2205/04; F04B 35/04; G01L 7/166; G01L 19/16
See application file for complete search history.

(56) References Cited

U.S. PATENT DOCUMENTS 3,534,586 A * 10/1970 Matthews ............... G01L 7/166
                                                      73/861.71
5,983,728 A * 11/1999 Weng ...................... G01L 17/00
                                                      116/285
(Continued)

FOREIGN PATENT DOCUMENTS

CN         212539504      2/2021
JP          S513016       1/1976
(Continued)

OTHER PUBLICATIONS

"Office Action of Japan Counterpart Application", issued on Apr. 18, 2025, p. 1-p. 5.

*Primary Examiner* — David N Brandt
(74) *Attorney, Agent, or Firm* — JCIPRNET

(57)      ABSTRACT

An air compressor structure includes a cylinder, a piston, a cylinder lid, and a pressure gauge. The piston coupled in the cylinder performs reciprocating motion to generate compressed air, and the cylinder lid is assembled to the cylinder to receive the compressed air. The pressure gauge includes a propelling barrel movably disposed in the cylinder lid and having a gear rack, a value panel disposed on a surface of the cylinder lid, a pointer, and a spring disposed in the cylinder lid and abutting against the propelling barrel. The pointer includes a pointing portion and a pivot, where the pivot is disposed on the cylinder lid and has a gear engaged to the gear rack, and the pointing portion extends from the pivot and is located on the value panel.

8 Claims, 9 Drawing Sheets

(51) Int. Cl.
   *F04B 51/00* (2006.01)
   *G01L 7/16* (2006.01)
   *G01L 19/16* (2006.01)

(56) References Cited

U.S. PATENT DOCUMENTS

2015/0078920 A1* 3/2015 Chou ................. G01L 19/0618
                                                          417/63
2018/0356307 A1* 12/2018 Wu ........................ G01L 7/166

FOREIGN PATENT DOCUMENTS

| | | |
|---|---|---|
| JP | H11153504 | 6/1999 |
| JP | 2001091391 | 4/2001 |
| JP | 3189342 | 3/2014 |
| JP | 2015055245 | 3/2015 |

* cited by examiner

Compressed air

AIR COMPRESSOR STRUCTURE

CROSS-REFERENCE TO RELATED APPLICATION

This application claims the priority benefit of U.S. provisional application Ser. No. 63/624,772, filed on Jan. 24, 2024, and Taiwan application serial no. 113117158, filed on May 9, 2024. The entirety of each of the above-mentioned patent applications is hereby incorporated by reference herein and made a part of this specification.

BACKGROUND

Technical Field

The disclosure relates to an air compressor structure.

Description of Related Art

Existing small air compressors used for inflating car tires, air mattresses, etc., have only two air outlet ducts on an air storage base, one of which is used for installing a round box-shaped pressure gauge, and the other one is used for connecting a hose with an air nozzle at one end. The air nozzle is connected to an object to be inflated, such as a car tire, and compressed air generated by the operation of the air compressor is delivered to the object to be inflated to achieve the purpose of inflating. The pressure gauge allows the user to visually check a current pressure value to serve as a basis for controlling the safety of the inflation operation.

The above-mentioned pressure gauges are mostly mechanical pointer type pressure gauges based on a Bourdon tube principle. However, this type of pressure gauge requires more precision components, and the precision components are also easy to be damaged, leading to a loss of accuracy in measurement, so that the effectiveness of using this type of pressure gauge is not significant.

SUMMARY

The disclosure is directed to an air compressor structure, which simplifies a structure of a pressure gauge while considering durability.

The disclosure provides an air compressor structure including a cylinder, a piston, a cylinder lid, and a pressure gauge. The piston is coupled in the cylinder and performs reciprocating motion to generate compressed air. The cylinder lid is assembled to the cylinder to receive the compressed air. The pressure gauge includes a propelling barrel, a value panel, a pointer, and a spring. The propelling barrel is movably disposed in the cylinder lid and has a gear rack. The value panel is disposed on a surface of the cylinder lid. The pointer includes a pointing portion and a pivot, where the pivot is disposed on the cylinder lid and has a gear engaged to the gear rack, and the pointing portion extends from the pivot and is located on the value panel. The spring is disposed in the cylinder lid and abuts against the propelling barrel. The compressed air provides a driving force to the propelling barrel, so that the propelling barrel moves within the cylinder lid and deforms the spring to generate an elastic force. The moving propelling barrel moves the pointing portion of the pointer on the value panel through a collaboration of the gear rack and the gear until the driving force and the elastic force are balanced, and the propelling barrel stops moving to reflect a pressure value of the compressed air.

Based on the above descriptions, the pressure gauge of the air compressor structure is installed on the cylinder lid, so that the compressed air generated by the reciprocating movement of the piston in the cylinder may directly enter the cylinder lid, and the pressure value of the compressed air may be reflected immediately through the pressure gauge. The pressure gauge includes a propelling barrel, a value panel, a pointer, and a spring, where the compressed air provides a driving force to the propelling barrel to move the propelling barrel within the cylinder lid, and the moving propelling barrel may convert a linear motion of the propelling barrel into a rotational motion of the pointer through a collaboration of the gear rack and the gear of the pointer. At the same time, the linear motion of the propelling barrel may deform the spring abutted against the propelling barrel to generate an elastic force until the elastic force and the driving force are balanced, the propelling barrel stops moving and the pointer at this time points to the value panel to reflect the pressure value of the compressed air. Accordingly, the pressure gauge obviously has the effect of simplifying components, compared with the prior art, and the connection and cooperation between the components are intuitive without the need for complicated design, thus effectively balancing the simple and compact structure to achieve the purpose of pressure sensing.

DESCRIPTION OF THE EMBODIMENTS

Figure 1:
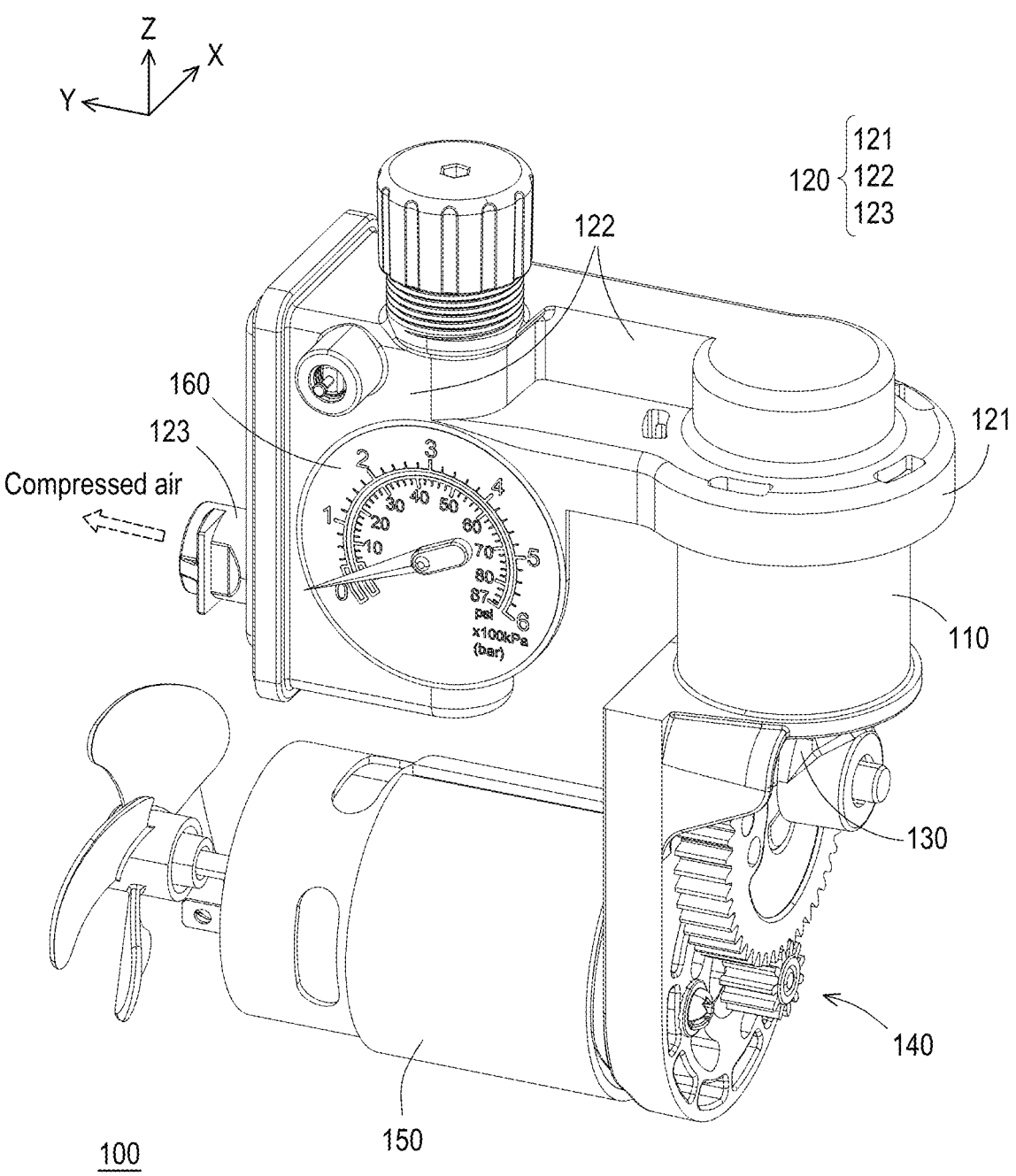
FIG. 1 is a schematic diagram of an air compressor structure according to an embodiment of the disclosure.
Figure 2:
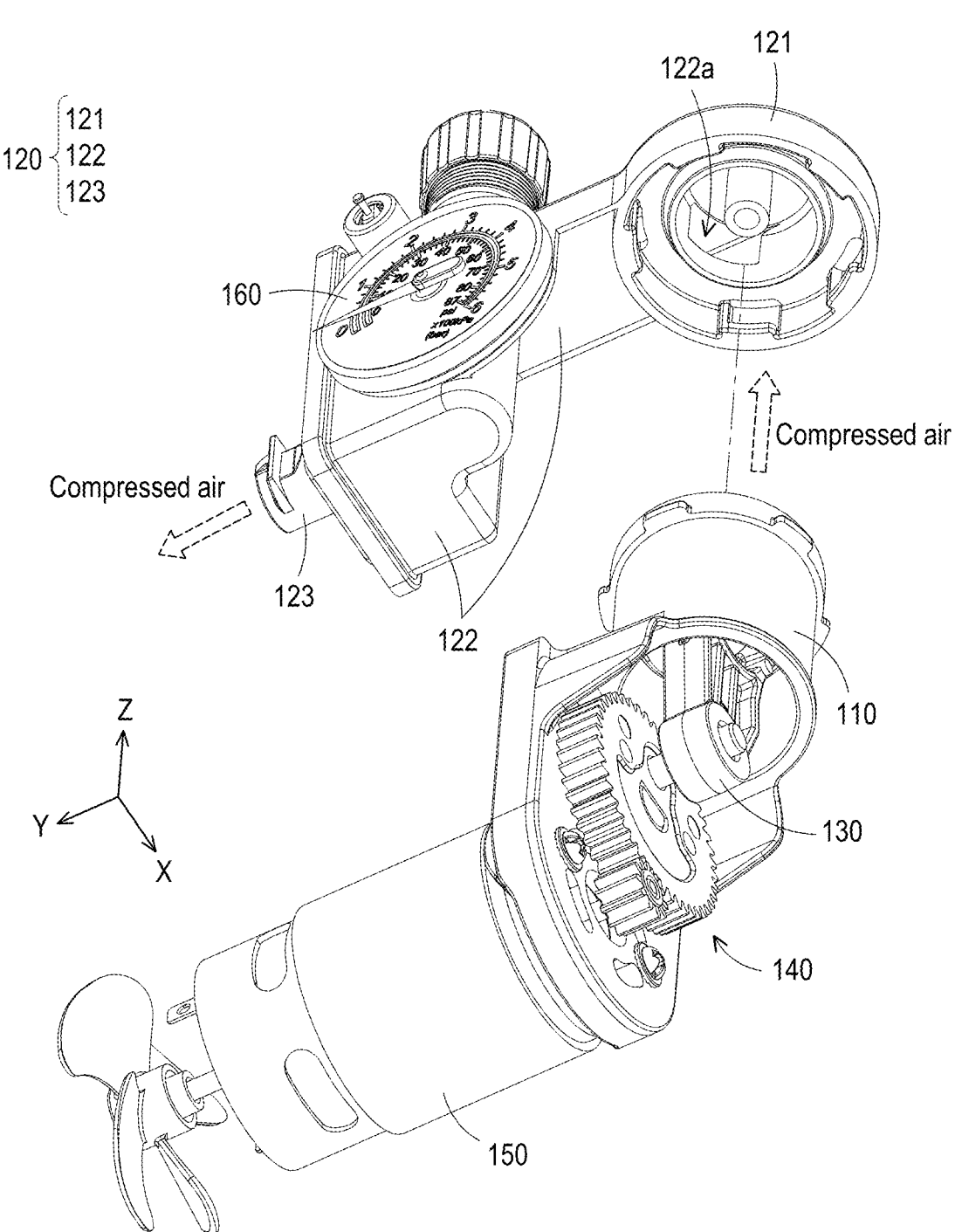
FIG. 2 is an exploded view of the air compressor structure of FIG. 1.

FIG. 1 is a schematic diagram of an air compressor structure according to an embodiment of the disclosure. FIG. 2 is an exploded view of the air compressor structure of FIG. 1. Here, Cartesian coordinates X-Y-Z are provided to facilitate component description. Referring to FIG. 1 and FIG. 2 at the same time, in the embodiment, the air compressor structure 100 includes a cylinder 110, a cylinder lid 120, a piston 130, a transmission mechanism 140, a motor 150 and a pressure gauge 160. The cylinder lid 120 is assembled to cylinder 110. The transmission mechanism 140 is connected between the motor 150 and a bottom end of the piston 130, and a top end of the piston 130 is movably coupled in the cylinder 110, so that the motor 150 may drives the piston 130 to reciprocate in the cylinder 110 through the transmission mechanism 140 (such as the gear set shown in the figure) to generate compressed air, where the top end of the piston 130 moves closer to or away from the cylinder lid 120 along with the reciprocating motion. When the piston 130 compresses air, its top end also moves toward the cylinder lid 120 and squeezes the compressed air from the cylinder 110 to the cylinder lid 120. When the piston 130 returns and resets, the top end of the piston 130 moves away from the cylinder lid 120, and air from an external environment flows into the cylinder 110. The cylinder lid 120 has an air outlet 123. After the piston 130 generates the compressed air in the cylinder 110, the compressed air is squeezed into the cylinder lid 120 by the piston 130 as mentioned above, and is then discharged from the air compressor structure 100 through the air outlet 123.

As shown in FIG. 2, the cylinder lid 120 presents an integrated structural feature in structure, and is divided into a lid body 121, a carrier 122 and the aforementioned air outlet 123, where after the compressed air enters the lid body 121 of the cylinder lid 120 from the cylinder 110, it enters an air storage chamber 122a of the carrier 122, and is finally discharged from the cylinder lid 120 through the air outlet 123.

Figure 3:
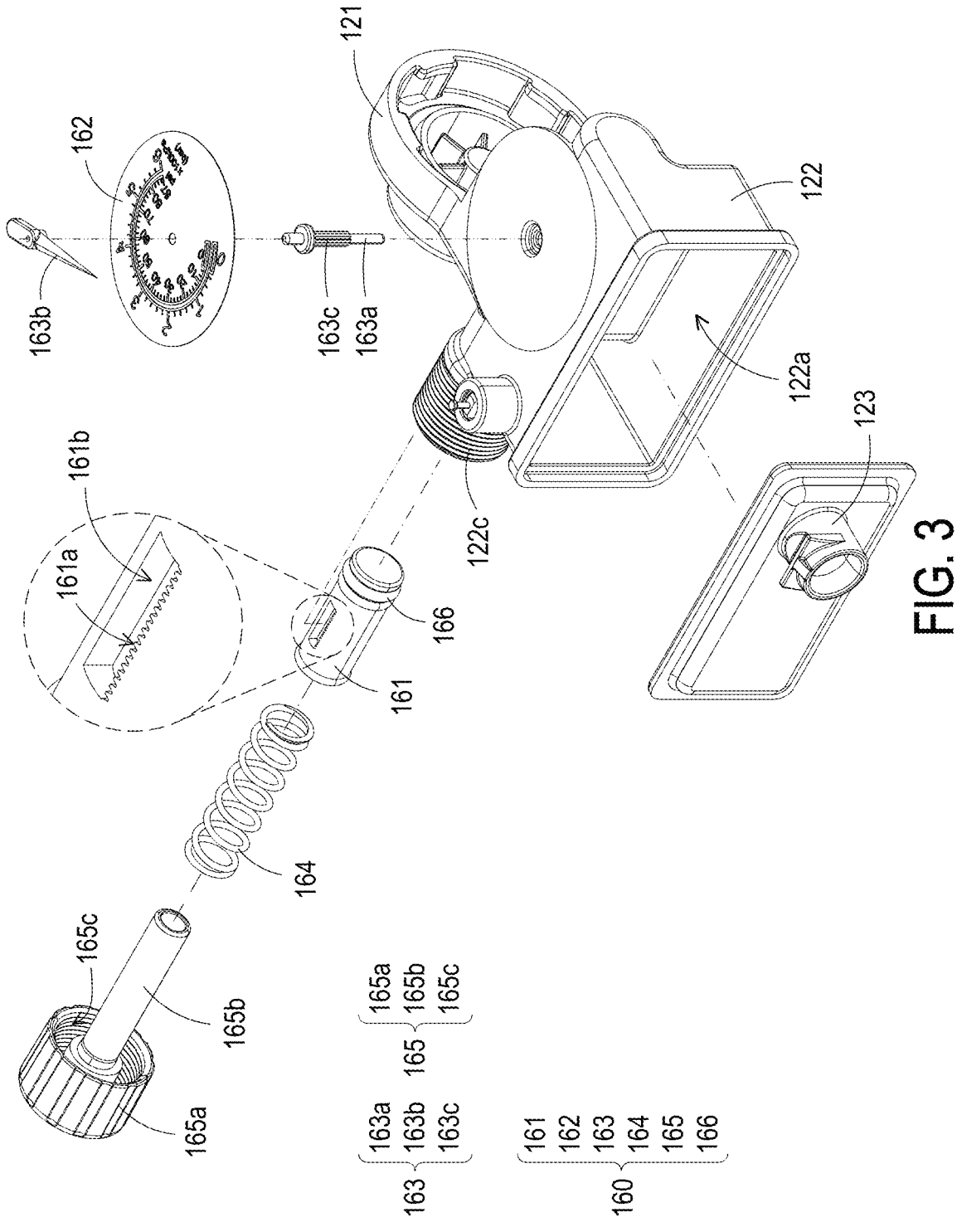
FIG. 3 is an exploded view of components of a cylinder lid.
Figure 4:
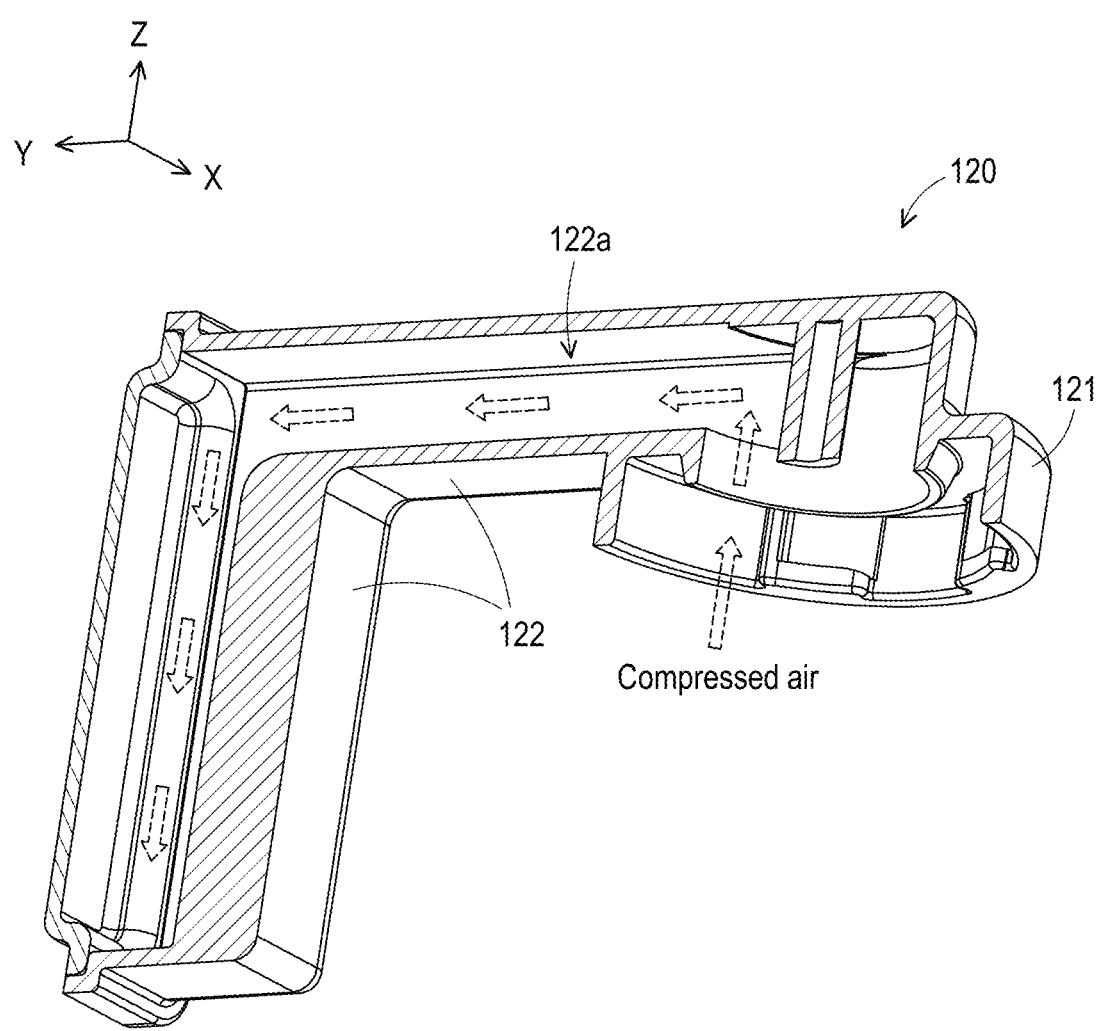
FIG. 4 is a partial cross-sectional view of the cylinder lid.
Figure 5A:
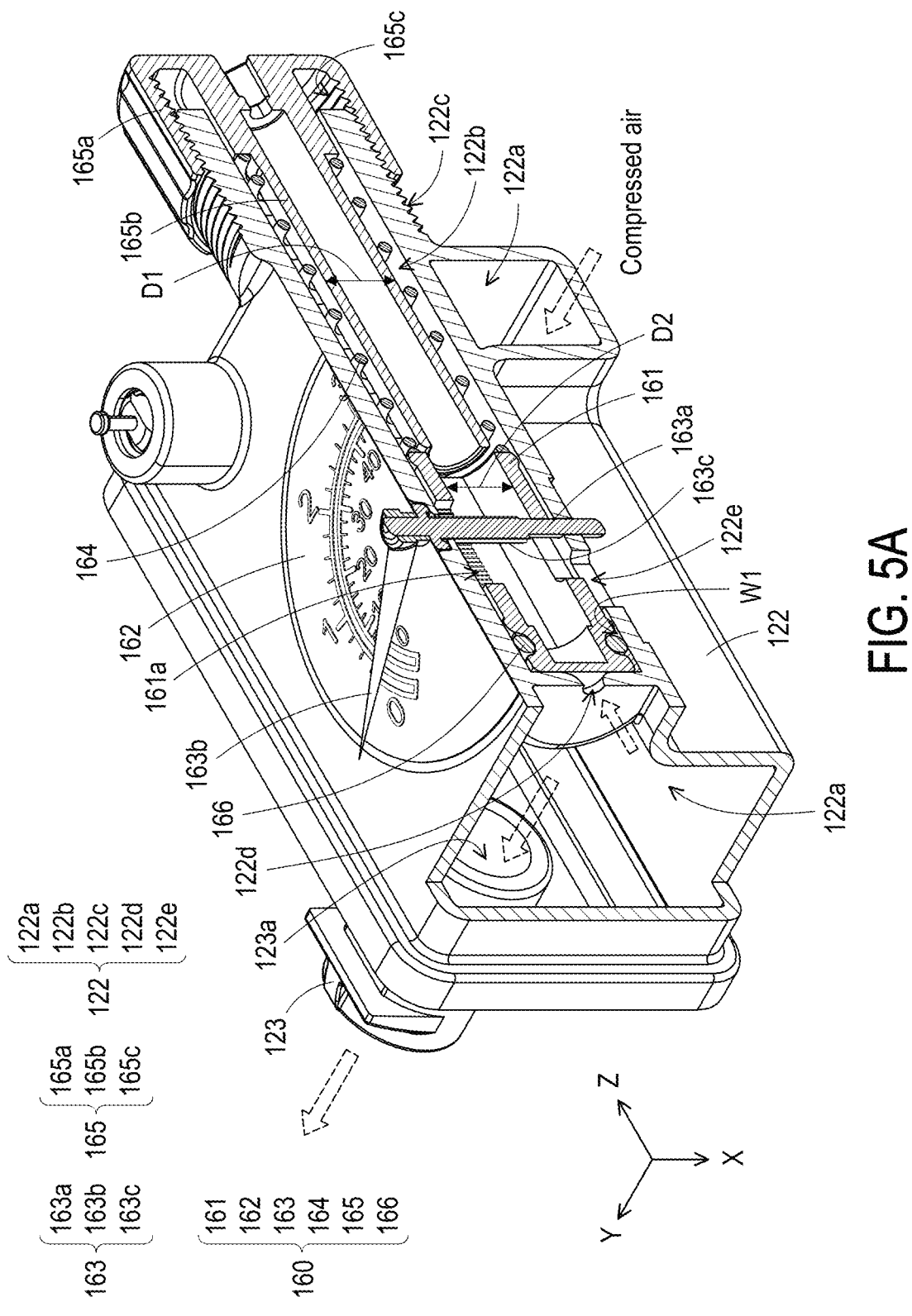
FIG. 5A is a partial cross-sectional view of the cylinder lid and pressure gauge.

FIG. 3 is an exploded view of the components of the cylinder lid. FIG. 4 is a partial cross-sectional view of the cylinder lid. FIG. 5A is a partial cross-sectional view of the cylinder lid and pressure gauge. Referring to FIG. 3, FIG. 4 and FIG. 5A at the same time, in the embodiment, the air outlet 123 extends into the air storage chamber 122a to form an opening 123a. Therefore, after the compressed air enters the air storage chamber 122a of the carrier 122 through the lid body 121, the compressed air may be discharged from the carrier 122 through the opening 123a and the air outlet 123.

Moreover, the carrier 122 further has an accommodating chamber 122b, which is separated from the air storage chamber 122a but communicates with the air storage chamber 122a through an opening 122d. The pressure gauge 160 includes a propelling barrel 161, a value (scale) panel 162, a pointer 163, a spring 164, and an adjusting member 165. The propelling barrel 161 is movably disposed in the accommodating chamber 122b of the cylinder lid 120, and the propelling barrel 161 has a notch 161b and a gear rack 161a located at a side edge of the notch 161b. The value panel 162 is disposed on a surface of the cylinder lid 120. The pointer 163 has a pointing portion 163b and a pivot 163a. The pivot 163a is disposed on the cylinder lid 120 and passes through the propelling barrel 161 and the notch 161b. A gear 163c is disposed on the outside of the pivot 163a to be coupled to the gear rack 161a located at one side of the notch 161b. The pointing portion 163b extends from the pivot 163a and is located on the value panel 162. The compressed air in the air storage chamber 122a of the cylinder lid 120 enters the accommodating chamber 122b through the opening 122d to drive the propelling barrel 161 to move in a positive Z-axis direction, and makes the pointing portion 163b of the pointer 163 to move on the value panel 162 (rotate relative to the X-axis) through a collaboration of the gear rack 161a and the gear 163c, so as to reflect a pressure value of the compressed air.

Figure 5B:
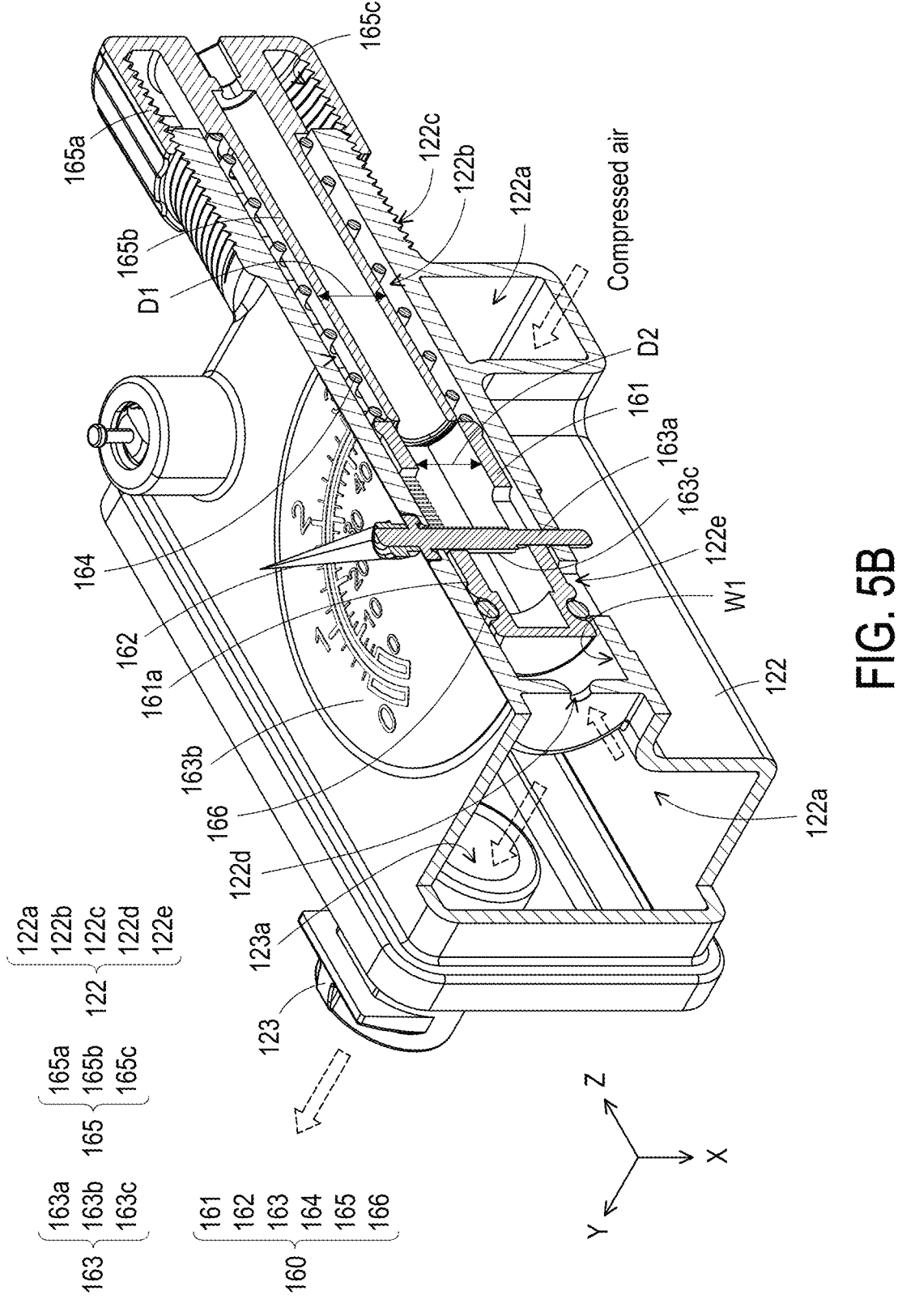
FIG. 5B illustrates another state of the pressure gauge of FIG. 5A.

FIG. 5B illustrates another state of the pressure gauge of FIG. 5A. Referring to FIG. 5A and FIG. 5B at the same time, in the embodiment, the spring 164 is located in the accommodating chamber 122b and abuts against the propelling barrel 161 to resist a driving force exerted on the propelling barrel 161 by the compressed air, and the adjusting member 165 is movably assembled on the cylinder lid 120, the spring 164 abuts between the adjusting member 165 and the propelling barrel 161. Further, the adjusting member 165 includes a cover body 165a and a shaft body 165b. The cover body 165a has an internal thread 165c to be movably screwed to a stud 122c extending from the carrier 122 of the cylinder lid 120. The spring 164 abuts between the cover body 165a and the propelling barrel 161, the shaft body 165b extends from the cover body 165a and extends into the accommodating chamber 122b of the cylinder lid 120, where the spring 164 is sleeved on the shaft body 165b. Moreover, an outer diameter D1 of the shaft body 165b in the embodiment is smaller than an inner diameter D2 of the propelling barrel 161, so that the propelling barrel 161 may be sleeved on the shaft body 165b when being driven by the compressed air to move in the positive Z-axis direction.

In this way, according to the corresponding relationship between the gear rack 161a and the gear 163c, an appropriate spring 164 may be selected to match the cover body 165a and the stud 122c to fine-tune the deformation of the spring 164, so that the pressure exerted on the propelling barrel 161 by the compressed air may drive the pointer 163 to point to a corresponding pressure value instantly and accurately.

In addition, the pressure gauge 160 of the embodiment further includes a sealing ring 166, which is sleeved on the propelling barrel 161 and abuts against an inner wall W1 of the accommodating chamber 122b of the cylinder lid 120. The sealing ring 166 moves along with the propelling barrel 161 in the accommodating chamber 122b. Moreover, the carrier 122 of the cylinder lid 120 has a pressure relief port 122e to communicate with the external environment and the accommodating chamber 122b, and the pressure relief port 122e is located on a moving path of the sealing ring 166, so that when the sealing ring 166 reaches the pressure relief port 122e, the compressed air that originally entered the accommodating chamber 122b to push the propelling barrel 161 may be discharged from the air compressor structure 100 through the pressure relief port 122e. This is to provide an extreme value limiting effect on the pressure gauge 160 to discharge excessive air pressure when a working air pressure is about to exceed a safe operating value, so as to protect the entire air compressor components, an object to be inflated and an operator from being damaged.

Figure 6A:
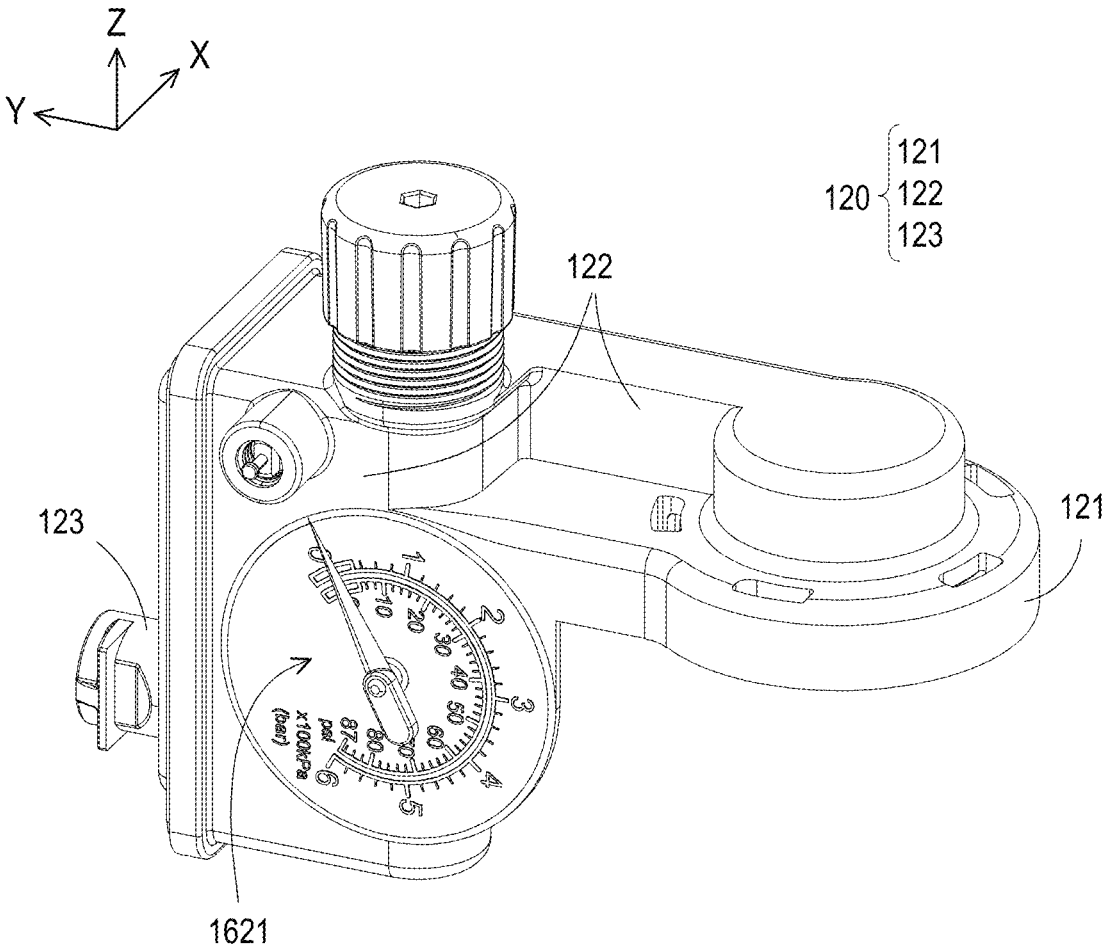
FIG. 6A to FIG. 6C are schematic diagrams showing the value panel being configured on the cylinder lid in different identification orientations.
Figure 6B:
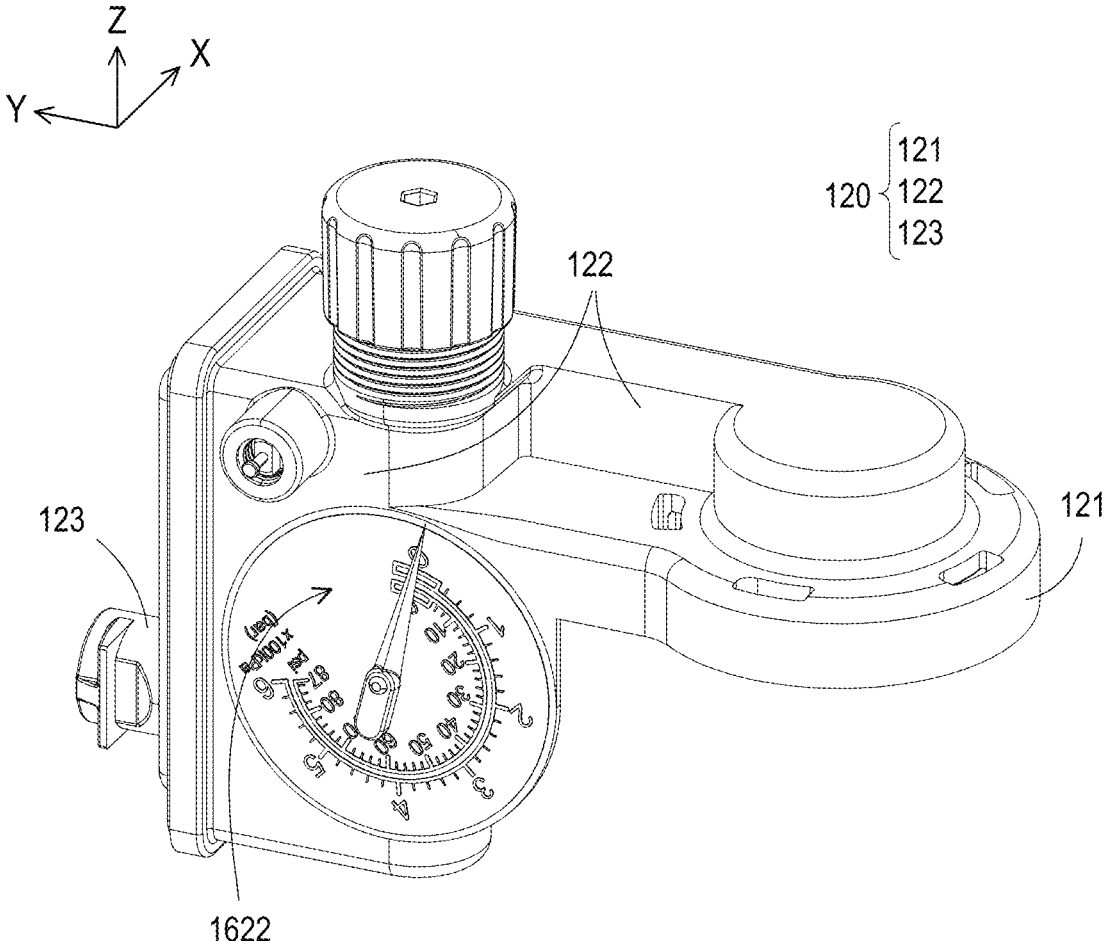
Figure 6C:
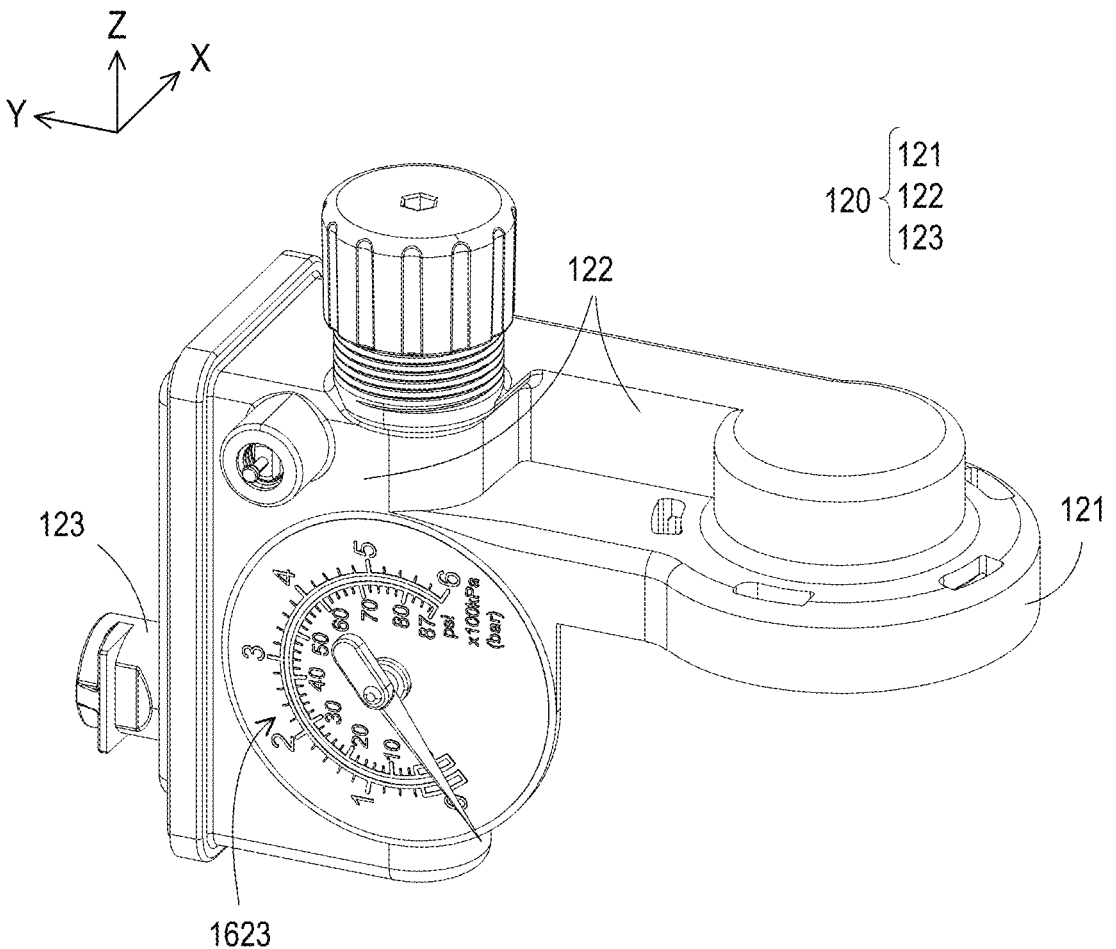

FIG. 6A to FIG. 6C are schematic diagrams showing the value panel being configured on the cylinder lid in different identification orientations. Referring to FIG. 6A to FIG. 6C at the same time, in the embodiment, as the pointer 163 (the pointing portion 163b) performs a rotational movement on the value panel 162 relative to the X-axis due to driving of the pivot 163a, in order to facilitate the user's operation and identification habits, value panels 1621, 1622, and 1623 are configured on the surface of the carrier 122 of the cylinder lid 120 by using a variety of different identification orientations for the user to select.

In summary, in the above embodiments of the disclosure, the pressure gauge of the air compressor structure is installed on the cylinder lid, so that the compressed air generated by the reciprocating movement of the piston in the cylinder may directly enter the cylinder lid, and the pressure value of the compressed air may be reflected immediately through the pressure gauge. The pressure gauge includes a propelling barrel, a value panel, a pointer, and a spring, where the compressed air provides a driving force to the propelling barrel to move the propelling barrel within the cylinder lid, and the moving propelling barrel may convert a linear motion of the propelling barrel into a rotational motion of the pointer through a collaboration of the gear rack and the gear of the pointer. At the same time, the linear motion of the propelling barrel may deform the spring abutted against the propelling barrel to generate an elastic force until the elastic force and the driving force are balanced, the propelling barrel stops moving and the pointer at this time points to the value panel to reflect the pressure value of the compressed air.

Moreover, the pressure gauge further includes an adjusting member, where the spring abuts between the adjusting member and the propelling barrel. Therefore, through selection and match of the characteristics of the gear rack and the gear, plus the elasticity of the spring and the control of the spring deformation by the adjusting member, the pressure value of the compressed air may be reflected on the value panel immediately and accurately through the pointer. Conversely, for pistons and cylinders with different compression capabilities, the selection of the above components may also reflect the adaptability to compressed air.

Accordingly, the pressure gauge obviously has the effect of simplifying components, compared with the prior art, and the connection and cooperation between the components are intuitive without the need for complicated design, thus effectively balancing the simple and compact structure to achieve the purpose of pressure sensing.

What is claimed is:

1. An air compressor structure, comprising:

a cylinder;

a piston, coupled in the cylinder and performing reciprocating motion to generate compressed air;

a cylinder lid, assembled to the cylinder to receive the compressed air; and a pressure gauge, comprising:

a propelling barrel, movably disposed in the cylinder lid and having a gear rack;

a value panel, disposed on a surface of the cylinder lid; and a pointer, having a pointing portion and a pivot, wherein the pivot is disposed on the cylinder lid and has a gear engaged to the gear rack, and the pointing portion extends from the pivot and is located on the value panel; and a spring, disposed in the cylinder lid and abutting against the propelling barrel, wherein the compressed air provides a driving force to the propelling barrel, so that the propelling barrel moves within the cylinder lid and deforms the spring to generate an elastic force, the moving propelling barrel moves the pointing portion of the pointer on the value panel through a collaboration of the gear rack and the gear until the driving force and the elastic force are balanced, and the propelling barrel stops moving to reflect a pressure value of the compressed air, wherein the pressure gauge further comprises a sealing ring sleeved on the propelling barrel and abutting against an inner wall of the cylinder lid, and the sealing ring moves within the cylinder lid along with the propelling barrel.

2. The air compressor structure as claimed in claim 1, wherein the pressure gauge further comprises an adjusting member movably assembled on the cylinder lid, and the spring abuts between the adjusting member and the propelling barrel.

3. The air compressor structure as claimed in claim 2, wherein the adjusting member comprises a cover body and a shaft body, the cover body is movably screwed to the cylinder lid, the spring abuts between the cover body and the propelling barrel, the shaft body extends from the cover body and extends into the cylinder lid, and the spring is sleeved on the shaft body.

4. The air compressor structure as claimed in claim 3, wherein an outer diameter of the shaft body is smaller than an inner diameter of the propelling barrel, so that the propelling barrel is adapted to sleeve on the shaft body when being driven by the compressed air to move.

5. The air compressor structure as claimed in claim 3, wherein the cylinder lid has an accommodating chamber and an air storage chamber that communicate with each other, the air storage chamber receives the compressed air, and the propelling barrel, a portion of the pointer inserted into the propelling barrel, the spring, and the shaft body are disposed in the accommodating chamber.

6. The air compressor structure as claimed in claim 1, wherein the propelling barrel has a notch, the gear rack is located on one side of the notch, and the pivot passes through the notch.

7. The air compressor structure as claimed in claim 1, wherein the cylinder lid has a pressure relief port configured to communicated with an external environment and located on a moving path of the sealing ring, so that when the sealing ring reaches the pressure relief port, the compressed air is discharged from the air compressor structure through the pressure relief port.

8. The air compressor structure as claimed in claim 1, wherein the pointer is driven by the pivot to rotate on the value panel, and the value panel is configured on the surface of the cylinder lid in one of a plurality of different identification orientations.

* * * * *